(12) United States Patent
Arai

(10) Patent No.: US 6,456,346 B1
(45) Date of Patent: Sep. 24, 2002

(54) COLOR LIQUID CRYSTAL DISPLAY DEVICE INCLUDING SUPER TWISTED NEMATIC LIQUID CRYSTAL WITH MOLECULAR MAJOR AXIS DIRECTIONS PARALLEL TO A DISPLAY SCREEN HORIZONTAL AXIS

(75) Inventor: Makoto Arai, Saitama (JP)

(73) Assignee: Citizen Watch Co., Ltd., Nishitokyo (JP)

(*) Notice: Subject to any disclaimer, the term of this patent is extended or adjusted under 35 U.S.C. 154(b) by 66 days.

(21) Appl. No.: 09/685,556

(22) Filed: Oct. 11, 2000

(30) Foreign Application Priority Data

Oct. 13, 1999 (JP) .............................. 11-290619

(51) Int. Cl.[7] .......................................... G02F 1/1335
(52) U.S. Cl. ...................... 349/106; 349/117; 349/121; 349/113; 349/114
(58) Field of Search .............................. 349/96, 97, 98, 349/76, 117, 121, 106, 113, 114, 61, 64, 179

(56) References Cited

U.S. PATENT DOCUMENTS 5,583,678 A * 12/1996 Nishino et al. ............... 345/95
5,705,302 A * 1/1998 Ohno et al. .................. 205/109
6,184,955 B1 * 2/2001 Okumura ..................... 349/162

FOREIGN PATENT DOCUMENTS

| JP | 59-198489 | 11/1984 |
| JP | 3-223715 | 10/1991 |
| JP | 5-241143 | 9/1993 |
| JP | 10-3078 | 1/1998 |
| JP | 2000-250043 | * 9/2000 |

* cited by examiner

Primary Examiner—William L. Sikes
Assistant Examiner—Tarifur R. Chowdhury
(74) Attorney, Agent, or Firm—Armstrong, Westerman & Hattori, LLP.

(57) ABSTRACT

A liquid crystal layer (6) composed of a super twisted nematic liquid crystal is sealed between a first substrate (1) having first electrodes (3) and a second substrate (2) having second electrodes (4), and a color filter is provided on any one of the first substrate (1) and the second substrate (2) to form an STN liquid crystal cell (20), and a polarizing film (11) is disposed outside the second substrate (2), which is the visible side of the STN liquid crystal cell (20), with a twisted retardation film (12) interposed therebetween, and a diffusing layer (13), a reflection-type polarizing film (14) and a light absorbing layer (15) are disposed in order outside the first substrate (1), and the liquid crystal layer (6) is aligned such that major axis directions of molecules located at the middle between the first and second substrates (1, 2) are parallel to the horizontal axis of a display screen.

7 Claims, 5 Drawing Sheets

COLOR LIQUID CRYSTAL DISPLAY DEVICE INCLUDING SUPER TWISTED NEMATIC LIQUID CRYSTAL WITH MOLECULAR MAJOR AXIS DIRECTIONS PARALLEL TO A DISPLAY SCREEN HORIZONTAL AXIS

BACKGROUND OF THE INVENTION

1. Field of the Invention

The present invention relates to a reflection-type or transflective color liquid crystal display device containing a color filter therein, capable of a multicolor display.

2. Description of the Related Art

Conventionally, a reflection-type liquid crystal display device for performing a monochrome display using a TN (twisted nematic) liquid crystal cell or an STN (super twisted nematic) liquid crystal cell, has been mainly used as a display device of a portable electronic device such as an electronic notepad, an electronic dictionary, a Personal Digital Assistant (PDA), or the like.

However, in recent years, due to the increases in amount and diversification of information, there has been a growing demand for a color display and thus reflection-type or transflective color liquid crystal display devices containing color filters therein have been vigorously developed.

The reflection-type color liquid crystal display devices containing color filters therein are broadly classified into the following three types.

The first type is a reflection-type color liquid crystal display device without a polarizing film. This type includes one using a Guest-Host liquid crystal in which a dichroic dye or a black dye is mixed in a liquid crystal material which is sealed in a liquid crystal cell, one using a polymer-dispersion liquid crystal in which a liquid crystal material is dispersed in a polymer, or so on.

The reflection-type color liquid crystal display device using a Guest-Host liquid crystal is disclosed in, for example, Japan Patent Laid-open No. S59-198489 (JP, 59-198489, A). The reflection-type color liquid crystal display device using a polymer-dispersion liquid crystal is disclosed in, for example, Japan Patent Laid-open No. H5-241143 (JP, 5-241143, A).

Since none of them uses a polarizing film, they have excellent brightness but low in contrast, and thus they have not been realized for practical use yet.

The second type is a reflection-type color liquid crystal display device using one polarizing film and containing a reflector inside the liquid crystal display device. This type is further divided into two types, and one type uses a self-contained reflector with a reflection face of a mirror surface which has a light diffusing layer on the reflection face side, and the other type uses a self-contained reflector with light scattering properties in the reflection face.

Both types are good in chroma with little color mixture because light is reflected inside the liquid crystal cell. Further, they also have excellent brightness because of only one polarizing film, though there is a problem of low contrast.

As for the type using a self-contained reflector with a reflection face of a mirror surface, it is bright in a direction of regular reflection of incident light, but it becomes abruptly darker at other angles, and thus there is also a problem that the viewing angle characteristic thereof is quite poor.

Also the other type using a self-contained reflector with light scattering properties in the reflection face has a problem that it is difficult to control the light scattering properties and the fabricating process becomes complicated.

The reflection-type liquid crystal display device using one polarizing film as described above is disclosed in, for example, Japan Patent Laid-open No. H3-223715 (JP, 3-223715, A).

The third type is a color liquid crystal display device made by providing a color filter in a liquid crystal cell of a typical monochrome liquid crystal display device using two polarizing films and providing a reflector outside the liquid crystal cell. Since this color liquid crystal display device uses two polarizing films, it is excellent in contrast, but it has the disadvantage of a dark display.

However, a reflection-type polarizing film is used in place of the polarizing film and the reflector which are provided on the opposite side to the visible side of the liquid crystal cell, thereby improving brightness of the display, and this color liquid crystal display device is considered adequate for practical use.

The color liquid crystal display device using a reflection-type polarizing film as described above is disclosed in, for example, Japan Patent Laid-open No. H10-3078 (JP, 10-3078, A).

The third type of color liquid crystal display device, however, has spectral characteristics that its reflectance is low on the long wavelength side when performing a reflection-type color display.

Therefore, the chroma of red is low and the background color has green mist, and thus a color display goes out of color balance, bringing about a problem of bad visibility.

SUMMARY OF THE INVENTION

An object of the present invention is to improve the spectral reflectance characteristics in a color liquid crystal display device of the third type, and especially to improve the chroma of red by increasing the reflectance on the long wavelength side, thereby enabling a multicolor display with high chroma on a white background.

The color liquid crystal display device according to the present invention is configured as follows in order to attain the above-described object.

An STN liquid crystal cell comprises a first substrate having first electrodes, a second substrate having second electrodes, a color filter provided on any one of the first substrate and second substrate, and a liquid crystal layer composed of a super twisted nematic liquid crystal sealed between the first substrate and second substrate and aligned such that major axes of liquid crystal molecules are twisted at an angle of 180° to 270°.

A polarizing film is provided on the outside of the second substrate which is the visible side of the STN liquid crystal cell, and a twisted retardation film is provided between the polarizing film and the second substrate. Further, a diffusing layer, a reflection-type polarizing film, and a light absorbing layer are provided outside the first substrate in order.

Further, the super twisted nematic liquid crystal of the liquid crystal layer is aligned such that major axis directions of liquid crystal molecules located at the middle between the first substrate and second substrate are parallel to a horizontal axis of a display screen.

When the light absorbing layer in the reflection-type color liquid crystal display device is a translucent-type light absorbing layer and a backlight is disposed outside the translucent-type light absorbing layer, a transflective color liquid crystal display device can be made.

In this case, it is preferable that an average transmittance of the translucent-type light absorbing layer is in a range of 20% to 60%.

Further, it is desirable that a difference in absolute value between a twist angle of the liquid crystal layer and a twist angle of the twisted retardation film is 10° to 30°.

It is suitable that red filters, green filters and blue filters are formed alternately in stripes shape as the color filter.

The above and other objects, features and advantages of the invention will be apparent from the following detailed description which is to be read in conjunction with the accompanying drawings.

DETAILED DESCRIPTION OF THE PREFERRED EMBODIMENTS

Hereinafter, embodiments of the present invention will be described concretely using the drawings.
First Embodiment: FIG. 1 to FIG. 6

Figure 1:
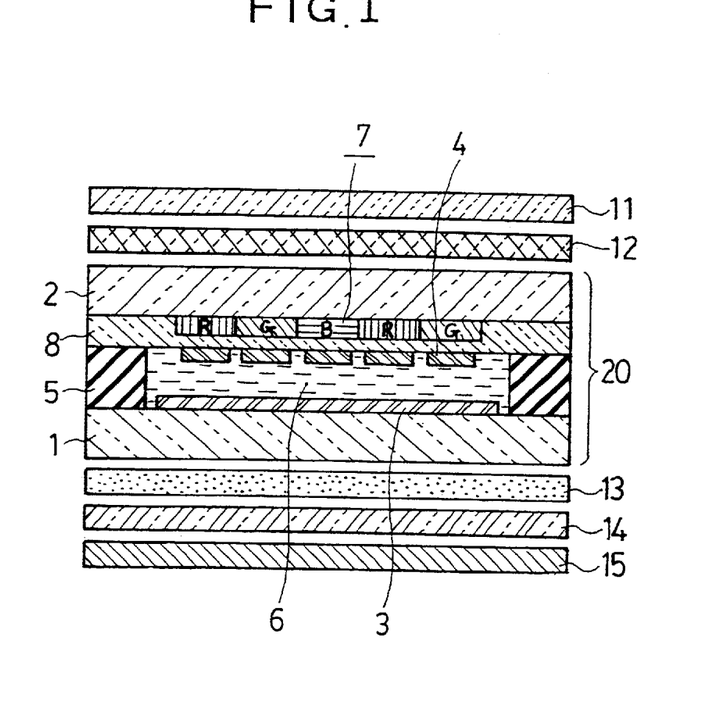
FIG. 1 is a schematic sectional view showing components of a first embodiment of a color liquid crystal display device according to the present invention.
Figure 2:
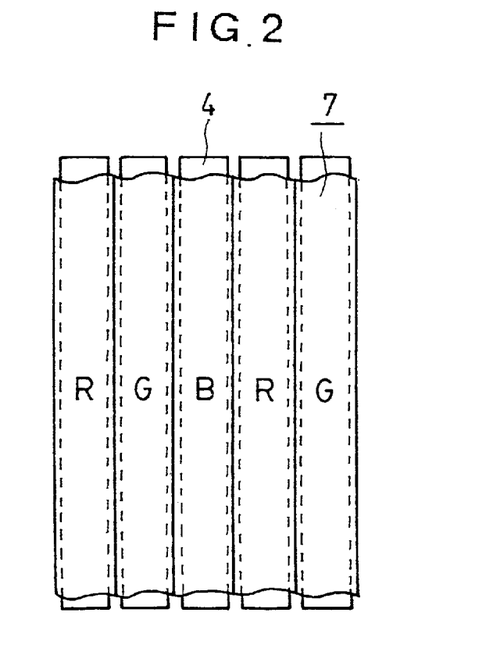
FIG. 2 is a plan view showing the shapes of a color filter and second electrodes of the same.
Figure 3:
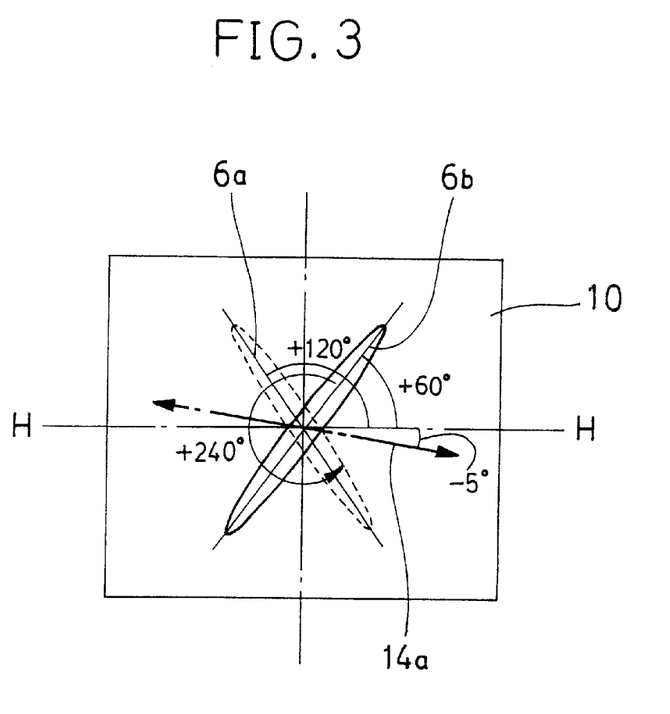
FIG. 3 is an explanatory view showing the plane positional relation between a liquid crystal layer 6 and a reflection-type polarizing film 14 in FIG. 1.
Figure 4:
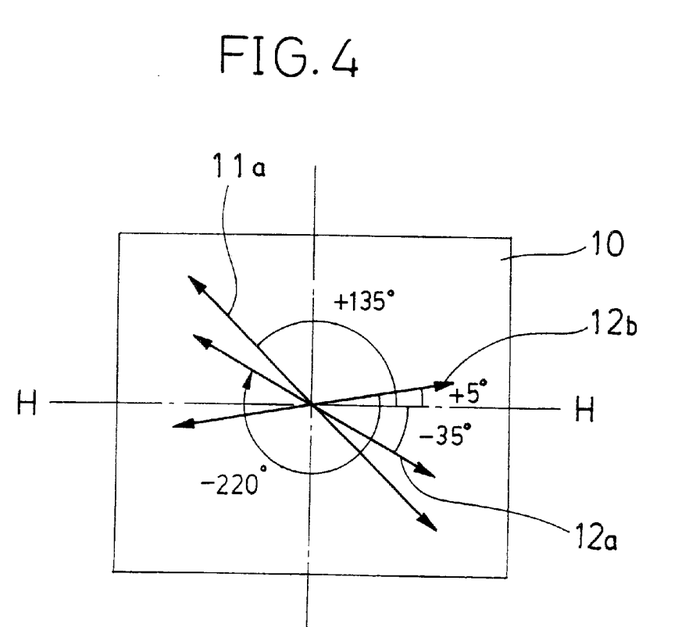
FIG. 4 is an explanatory view showing the plane positional relation between a polarizing film 11 and a twisted retardation film 12 in FIG. 1.

The structure of a first embodiment of a color liquid crystal display device according to the present invention will be described using FIG. 1 to FIG. 4. FIG. 1 is a schematic sectional view for explaining components of the color liquid crystal display device, FIG. 2 is a plan view showing the shapes of a color filter and second electrodes of the same, and FIG. 3 and FIG. 4 are explanatory views showing the plane positional relations between components of the same.

In the color liquid crystal display device of the first embodiment, as shown in FIG. 1, an STN liquid crystal cell 20 is formed such that a first substrate 1 and a second substrate 2 each of which is made of a glass plate with a thickness of 0.5 mm are bonded together with a fixed gap therebetween using a sealing member 5, and a liquid crystal layer 6 composed of a super twisted nematic liquid crystal which is aligned such that major axis directions of liquid crystal molecules are twisted at an angle of 240° is sealed between the first substrate 1 and the second substrate 2.

On the inner surface of the first substrate 1, first electrodes 3 composed of a transparent conductive film made of indium tin oxide (hereinafter referred to as "ITO") are formed in stripe shape at spaced intervals in a direction orthogonal to the paper surface.

Moreover, on the inner surface of the second substrate 2, a color filter 7 with a thickness of 0.3 $\mu$m formed by the pigment dispersion method and a protection film 8 with a thickness of 2 $\mu$m made of an acrylic material are formed, and second electrodes 4 made of ITO are formed on the protection film.

On the outside of the second substrate 2, which is the visible side (the upper side in FIG. 1) of the STN liquid crystal cell 20, a polarizing film 11 with a transmittance of 46% and a thickness of about 200 $\mu$m is disposed, and a twisted retardation film 12 with a retardation value Rf=0.61 $\mu$m is disposed between the polarizing film 11 and the second substrate 2.

On the outside (the opposite side to the visible side, the lower side in FIG. 1) of the first substrate 1, a diffusing layer 13, a reflection-type polarizing film 14 and a light absorbing layer 15 are arranged in order, to form a reflection-type color liquid crystal display device.

It should be noted that the super twisted nematic liquid crystal of the liquid crystal layer 6 is aligned such that the major axis directions of liquid crystal molecules located at the middle between the first substrate 1 and the second substrate 2 are parallel to the horizontal axis of a display screen of this liquid crystal display device, and the description thereof will be described later in detail.

The reflection-type polarizing film 14 will be described here. A typical polarizing film has a transmission axis for transmitting linearly polarized light and an absorption axis for absorbing it. The reflection-type polarizing film 14 has, however, a transmission axis for transmitting linearly polarized light and a reflection axis for reflecting it. The transmission axis and the reflection axis are orthogonal to each other.

Accordingly, black printing or placement of a black film on the outside of the reflection-type polarizing film 14 as a light absorbing layer brings about a black display when the polarized direction of incident linearly polarized light is parallel to the transmission axis and a white display when it is parallel to the reflection axis. A bright white display can be obtained because of a considerably high reflection efficiency of the linearly polarized light which is reflected by the reflection axis.

Since the surface of the reflection-type polarizing film 14 is a mirror surface, it is bright in a direction of regular reflection of incident light but it becomes darker in other directions, and thus the viewing angle characteristic is poor. To improve the viewing angle characteristic, the diffusing layer 13 is provided on the surface of the visible side of the reflection-type polarizing film 14.

This embodiment employs a reflection-type polarizing film of the integral-type, for example, R-DF-C (trade name) manufactured by Sumitomo 3M Ltd., provided with a diffusing adhesive layer made by dispersing minute particles with different diameters in an adhesive as the diffusing layer 13. The reflection-type polarizing film consists of multi-layered thin films with different refractive indices into a thickness of about 200 $\mu$m. However, not limited to this, it is also suitable to use a reflection-type polarizing film consisting of a cholesteric liquid crystal polymer sandwiched between ¼ wavelength films, one utilizing a hologram, or so on.

The twisted retardation film 12 is a film made by applying a liquid crystal polymer having a twist to triacetyl cellulose (TAC) film or PET film after an aligning treatment, making it into a liquid crystal state at a high temperature of about 150° C., and cooling it rapidly to room temperature to fix the twisted state after adjusting the twist angle.

A twisted retardation film twisted right-handed with a twist angle Tc of −220° and Rc, which is Δnd, of 0.61 μm is used in this embodiment.

The color filter 7 is configured such that three color filters of red filters R, green filters G and blue filters B are arranged alternately, and each color filter is formed in vertical stripe shape with a fixed width as shown in FIG. 2 in this embodiment.

Each color filter is formed wider than the second electrode 4 so as not to produce a gap between the color filters. If a gap is produced in the color filter 7, the display becomes brighter due to the increase of incident light, but it is not preferable that the degree of purity of colors decreases because white light mixes into the display colors.

The relation between the thickness of the first substrate 1 and colors will be described. The color filter 7 is placed inside the second substrate 2, and incident light from the visible side is made incident from the top in FIG. 1 and passes through the polarizing film 11, the twisted retardation film 12, the second substrate 2, the color filter 7 and the liquid crystal layer 6. Then, after passing through the first substrate 1, the incident light is reflected by the reflection-type polarizing film 14 and passes again through the first substrate 1, the liquid crystal layer 6, the color filter 7, and finally the polarizing film 11, to reach the observer's eye.

However, if the first substrate 1 is thick, the color of the color filter 7 through which the incident light from a slanting direction passes when it is incident differs from the color of the color filter 7 through which the incident light passes when it is reflected, resulting in a degradation of the chroma due to color mixture.

Accordingly, the thinner the first substrate 1 is, the less color mixture due to incident light from a slanting direction there is, thereby obtaining excellent colors.

When prototypes of the STN liquid crystal cell 20 of which the first substrate 1 is variously changed in thickness were made, the result was that the first substrate 1 with a thickness of 0.5 mm or less provides excellent colors. The thinner the first substrate 1 is, the better the colors become. However, if the first substrate 1 is too thin, the workability deteriorates and the strength also lowers, therefore it is preferable to have a thickness of 0.1 mm or more. In this embodiment, a glass plate with a thickness of 0.5 mm is used for both the first substrate I and the second substrate 2.

The color filter 7 is preferably as high as possible in maximum transmittance in spectrum to improve brightness, and the maximum transmittance of each color filter is preferably 80% or higher, and more preferably 90% or higher.

Furthermore, the minimum transmittance in spectrum needs to be made as high as 20% to 50%.

As the color filter 7, a color filter of a pigment dispersion-type, a dyeing-type, a printing-type, a transfer-type, an electro-deposition-type or the like can be used. A pigment dispersion-type color filter in which pigment is dispersed in an acrylic or polyvinyl alcohol (PVA) photoresist is the most preferable because of its high heat resistance temperature and high purity of colors.

In this embodiment, in order to obtain the color filter with a high transmittance as described above, a thin color filter with a thickness of 0.3 μm or less is formed by applying a color resist containing 20% to 30% pigment in a photoresist on the second substrate 2 with a spinner, and thereafter performing an exposing process and a developing process.

Figure 5:
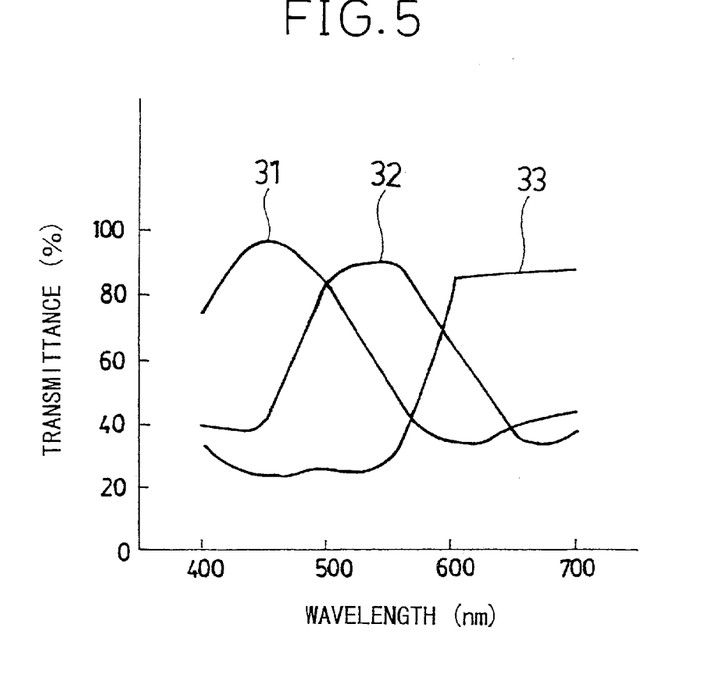
FIG. 5 is a diagram showing spectrums of the color filter 7 in FIG. 1.

The spectrums of the color filter 7 employed in this embodiment are shown in FIG. 5. In FIG. 5, a curved line 31, a curved line 32 and a curved line 33 each shown by a solid line show the spectrums of the blue filter B, the green filter G, and the red filter R, respectively.

Any color filter has a maximum transmittance of about 90% or higher, obtaining a bright display. Further, the minimum transmittance of any color filter is set at 30% to 40%. A minimum transmittance of 20% or lower causes the display to become darker and conversely a minimum transmittance of 50% or higher causes the chroma to lower, and thus neither is preferable.

The transmittances of the first electrodes 3 and the second electrodes 4 made of ITO are also important in terms of brightness. The lower the sheet resistance value of ITO is, the thicker the film thickness becomes and the lower the transmittance becomes.

Since the first electrodes 3 are applied with a data signal, having little influence of cross-talk, ITO with a sheet resistance of 100 ohms is used for them and the average transmittance is made about 92%.

Since the second electrodes 4 are applied with a scanning signal, it is necessary to reduce cross-talk, and thus ITO with a sheet resistance of 10 ohms is used for them. Although the average transmittance is lowered to about 89%, the transmittance of the first electrodes 3 is made 90% or higher, thereby improving brightness.

A so-called "chiral" material which is an optical rotatory material is added to the twisted nematic liquid crystal of the liquid crystal layer 6, and the twist pitch P thereof is adjusted to 11 μm, thereby aligning the twisted nematic liquid crystal at a twist angle of 240° counterclockwise between a pair of the substrates 1 and 2.

The plane positional relations between components of the color liquid crystal display device shown in FIG. 1 will be explained hereafter using FIG. 3 and FIG. 4.

On the surfaces of the first substrate 1 and the first electrodes 3 and the surfaces of the second substrate 2 and the second electrodes 4, alignment layers (not shown) are formed respectively.

As shown in FIG. 3, the alignment layer on the first substrate 1 side is subjected to a rubbing treatment in a direction at a 120° angle counterclockwise with respect to the horizontal axis H—H of a display screen 10 of this liquid crystal display device, whereby a lower molecular alignment direction 6a of the liquid crystal layer 6 is disposed at a +120° angle. Meanwhile, the alignment layer on the second substrate 2 side is subjected to a rubbing treatment in a direction at a 60° angle counterclockwise with respect to the horizontal axis H—H, whereby an upper molecular alignment direction 6b is disposed at a +60° angle. Here, the counterclockwise direction is indicated by plus (+), and the clockwise direction by minus (−).

A so-called "chiral" material which is an optical rotatory material, is added to the nematic liquid crystal, and the twist pitch P thereof is adjusted to 11 μm, thus forming the STN liquid crystal cell 20 including the liquid crystal layer 6 with a twist angle Ts of 240° counterclockwise sandwiched between a pair of the substrates 1 and 2.

In this event, the major axis directions (the alignment directions) of liquid crystal molecules located at the middle between upper liquid crystal molecules and lower liquid crystal molecules (that is, at the middle between the substrates 1 and 2) is disposed at an angle of 0°, resulting in alignment in a direction parallel to the horizontal axis H—H.

A difference Δn in birefringence due to anisotropy of refractive index of the twisted nematic liquid crystal used for the liquid crystal layer 6 is set to 0.15 and a cell gap d which is a gap between the first substrate 1 and the second substrate 2 is set to 5.6 μm.

Accordingly, Rs, which is a Δnd value of the STN liquid crystal cell 20, represented by the product of the difference Δn in the birefringence of the liquid crystal layer 6 and the cell gap d, is 0.84 μm.

A transmission axis 14a of the reflection-type polarizing film 14 shown in FIG. 1 is directed at a −5° angle with respect to the horizontal axis H—H of the display screen 10 as shown in FIG. 3. A polarization axis 11a of the polarizing film 11 is directed at a +135° angle with respect to the horizontal axis H—H as shown in FIG. 4.

The twisted retardation film 12 is, as shown in FIG. 4, disposed such that a lower molecular alignment direction 12a thereof is directed at a −35° angle with respect to the horizontal axis H—H and an upper molecular alignment direction 12b thereof is directed at a +5° angle, resulting in the twist angle Tc of 220° clockwise.

Accordingly, the difference ΔT in absolute value of the twist angle between the STN liquid crystal cell 20 and the twisted retardation film 12 results in ΔT=|Ts|−|Tc|=20°.

The STN liquid crystal cell 20 can be corrected best when its absolute value of the twist angle equals that of the twisted retardation film 12, that is, ΔT=0, whereby excellent white can be obtained during OFF state where no voltage is applied between the first electrodes 3 and the second electrodes 4. The above case is not suitable, however, for a reflection-type color display because excellent black can not be obtained during ON state where voltage is applied resulting in a low contrast.

In order to display excellent black in excellent shutter performance, it is preferable that ΔT is 10° to 30°. Especially, ΔT is set to 20° in the reflection-type color liquid crystal display device of this embodiment, whereby the transmittance of white during OFF state is high, and more than that, the shutter performance of black during ON state is excellent, and the viewing angle characteristic is also excellent.

The color liquid crystal display device according to the present invention structured as above goes into a normally white mode displaying white in the OFF state where no voltage is applied between the first electrodes 3 and the second electrodes 4, in which light is incident also through between pixels, so that a bright display can be obtained. In the ON state where voltage is applied between the first electrodes 3 and the second electrodes 4, the molecules of the liquid crystal layer 6 rise, resulting in a black display.

The combination of ON state and OFF state for each color of the color filter 7 enables a full-color display.

In this embodiment, a liquid crystal polymer film of which the twisted state is fixed at room temperature is used as the twisted retardation film 12. However, the use of a temperature-compensation-type twisted retardation film in which part of the liquid crystal molecules are only bound to polymer molecules in a chain state and Rc, which is Δnd thereof, varies with temperature improves the brightness and contrast at high temperatures, obtaining a better reflection-type color liquid crystal display device.

Figure 6:
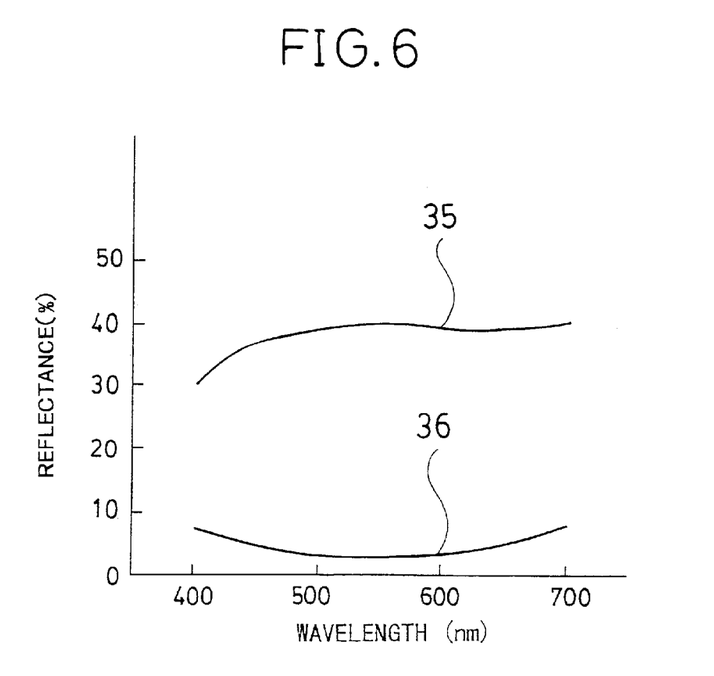
FIG. 6 is a diagram showing reflection characteristics of the color liquid crystal display device shown in FIG. 1.

FIG. 6 shows spectral reflectance characteristics during ON state and FF state in the case where the color filter 7 is removed from the color liquid crystal display device of this embodiment. A curved line 35 shown by a solid line shows the spectral reflectance of white display during OFF state, and a curved line 36 shows the spectral reflectance of black display during ON state when the color liquid crystal display device is driven at a frame frequency of 120 Hz.

To improve brightness, the reflection-type color liquid crystal display device is desirably designed such that the spectral reflectance characteristic is flat and the average reflectance thereof becomes highest during OFF state as shown by the curved line 35, and an excellent black characteristic capable of shutting light uniformly within the whole wavelength region can be obtained during ON state as shown by the curved line 36.

In this embodiment, by making the reflection type liquid crystal display device up of the polarizing film 11, the twisted retardation film 12, the STN liquid crystal cell 20 in which the alignment directions of the middle liquid crystal molecules of the liquid crystal layer 6 are disposed to be parallel to the horizontal axis of the display screen 10, including a color filter therein, the reflection-type polarizing film 14 and the light absorbing layer 15, the spectral characteristic of reflectance is improved and the reflectance on the long wavelength side within the visible light region is increased, suppressing coloring of the background color and improving the chroma of red, enabling a color display with high contrast and high chroma.

In the first embodiment, an STN liquid crystal cell with Rs of 0.84 μm at a twist angle of 240° is used as the STN liquid crystal cell 20, however, even with an STN liquid crystal cell with Rs of 0.7 to 1.0 at a twist angle of 180° to 270°, a similar reflection-type color liquid crystal display device can be obtained by optimizing arrangement angles of the polarizing film 11, the retardation film 12 and the reflection-type polarizing film 14.

Figure 7:
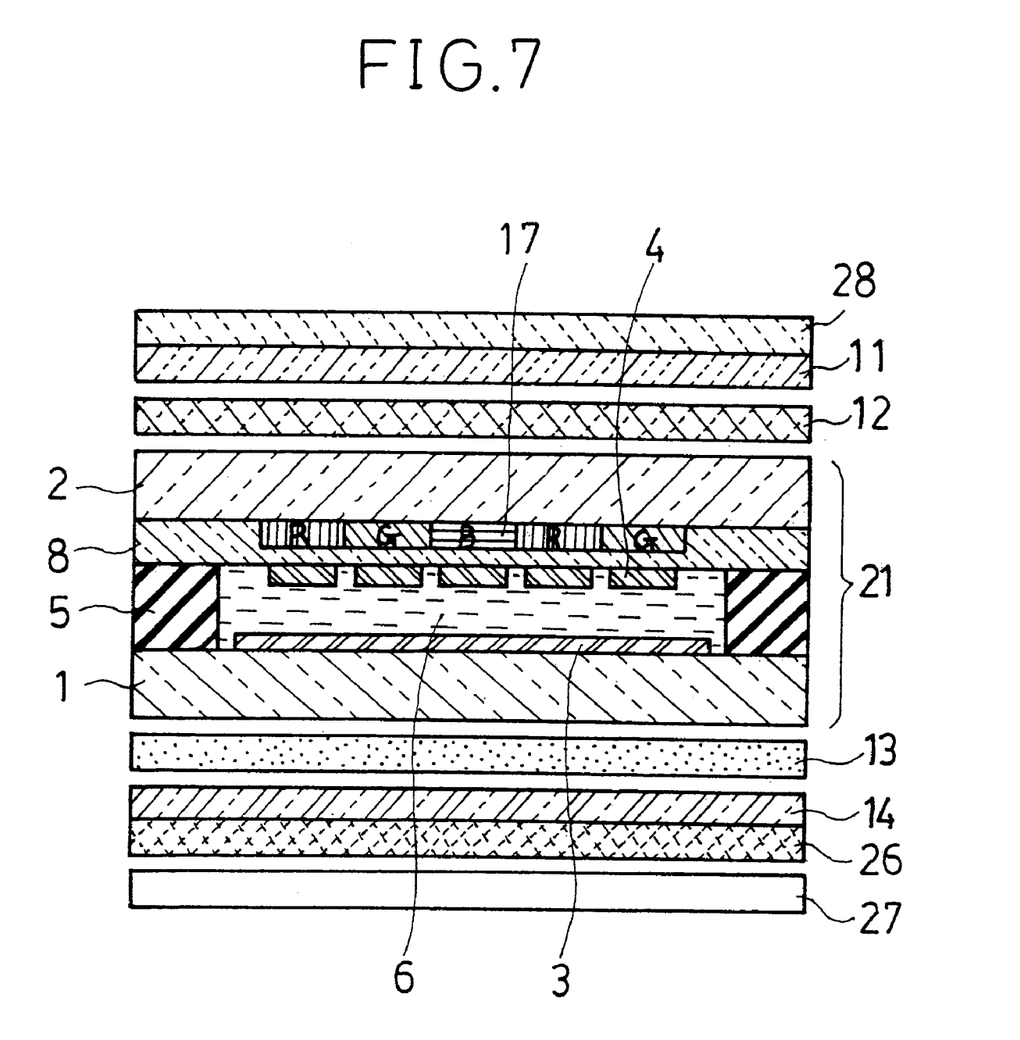
FIG. 7 is a schematic sectional view showing components of a second embodiment of a color liquid crystal display device according to the present invention.
Figure 8:
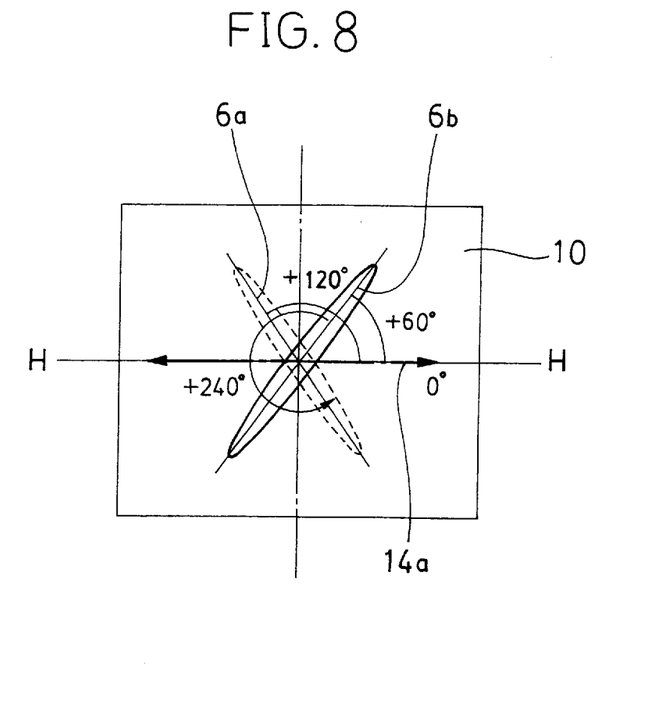
FIG. 8 is an explanatory view showing the plane positional relation between a liquid crystal layer 6 and a reflection-type polarizing film 14 in FIG. 7.
Figure 9:
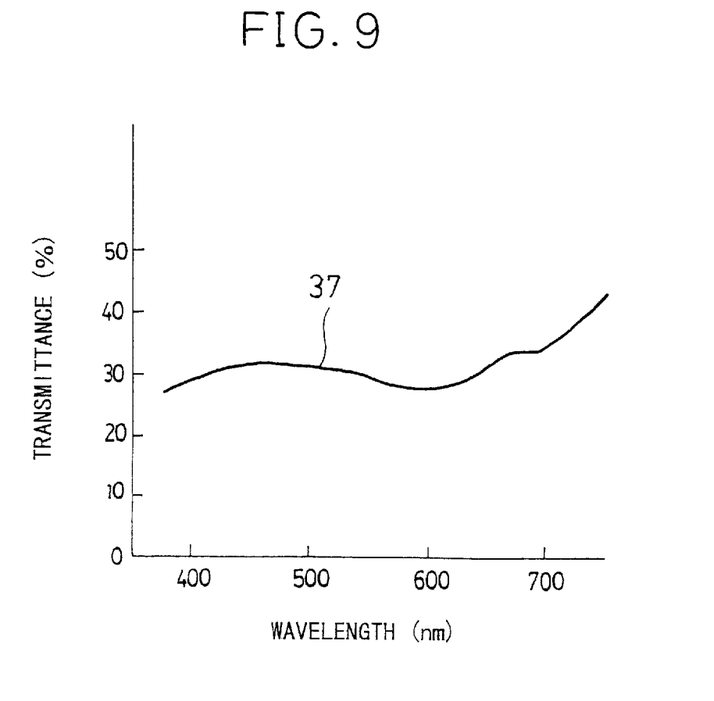
FIG. 9 is a diagram showing spectral transmittance characteristics of a translucent-type light absorbing layer 26 in FIG. 7.

Second Embodiment: FIG. 7 to FIG. 9

A second embodiment of a color liquid crystal display device according to the present invention is described hereafter with reference to FIG. 7 to FIG. 9.

The color liquid crystal display device of the second embodiment employs the same STN liquid crystal cell as that in the first embodiment, but a translucent-type light absorbing layer is provided as a light absorbing layer, and a backlight is disposed outside the translucent-type light absorbing layer to form a transflective color liquid crystal display device.

FIG. 7 is a schematic sectional view showing components of the transflective color liquid crystal display device, and FIG. 8 is a view showing the plane positional relation between a liquid crystal layer 6 and a reflection-type polarizing film 14 thereof. In these drawings, the same numerals are given to portions corresponding to those in FIG. 1 and FIG. 3, and the description thereof is omitted.

Incidentally, a view showing the plane positional relation between a polarizing film 11 and a twisted retardation film 12 is omitted because it is the same as that in FIG. 4.

An STN liquid crystal cell 21 in the color liquid crystal display device of the second embodiment has nearly the same structure as that of the STN liquid crystal cell 20 used in the first embodiment, but a color filter 17 is slight different from the color filter 7 used in the first embodiment.

The color filter 17 consists of three color filters of red filters R, green filters G and blue filters B which are provided on the surface of a second substrate 2 by the pigment dispersion method to have a thickness of 1 μm, and is formed such that the color filters are arranged alternately, each in vertical stripe shape overlapping second electrodes respectively, as in the color filter 7 of the first embodiment shown in FIG. 2.

This color filter 17 is, however, formed to have a maximum transmittance of 90% or higher and a minimum transmittance of about 40% in spectrums in spite of having a thickness of about 1.0 μm through the use of a color resist containing about 10% pigment in a photoresist, which is made thinner than that used for the color filter 7 of the first embodiment.

It is preferable to employ the color filter 17 because the adherence thereof with the second substrate 2 is better than the color filter 7 with a thickness of about 0.3 μm used in the first embodiment, and a stable shape can be obtained without occurrence of peeling-off defects of part of the color filter nor of the color filter being made thinner than required in width due to excessive etching.

The liquid crystal layer 6 sandwiched between a first substrate 1 and the second substrate 2 of the STN liquid crystal cell 21 is a twisted nematic liquid crystal aligned at a twist angle of 240° counterclockwise as in the first embodiment. Other configuration of the STN liquid crystal cell 21 is the same as that of the STN liquid crystal cell 20 of the first embodiment.

On the outside (the lower side in FIG. 7) of the first substrate 1 of the STN liquid crystal cell 21, a diffusing layer 13, a reflection-type polarizing film 14 and a translucent-type light absorbing layer 26 are arranged in order, and further a backlight 27 is disposed outside the translucent-type light absorbing layer 26.

On the outside (the visible side) of the second substrate 2, the twisted retardation film 12 and the polarizing film 11 are provided in order, in which a face on the visible side of the polarizing film 11 is coated with an anti-reflection layer 28 to bring its transmittance to 46%.

For the reflection-type polarizing film 14, employed is R-DF-C (trade name) manufactured by Sumitomo 3M Ltd. that is the same as that used in the first embodiment, in which a diffusing adhesive layer is applied on the front face.

The translucent-type light absorbing layer 26 is made by dyeing a polyethylene terephthalate (PET) film with a thickness of 20 μm with a black dye and is bonded to the rear face of the reflection-type polarizing film 14 with an adhesive.

The spectral characteristic of the translucent-type light absorbing layer 26 is shown by a curved line 37 in FIG. 9. The spectral characteristic shows a substantially flat transmittance from a wavelength of 400 nm to a wavelength of 650 nm, and the average transmittance of all wavelengths is about 30%.

As the backlight 27, a sidelight-type backlight made by a combination of a light guide film with a thickness of 3 mm and a three-wavelength-type fluorescent tube of a straight-type is used. The use of the three-wavelength-type fluorescent tube enables high luminance and further improves chroma during transmission illumination.

As the twisted retardation film 12, a right-handed twisted retardation film with a twist angle Tc of −220° and Rc, which is Δnd, of 0.61 μm is used, and that is the same as that used in the first embodiment.

The anti-reflection layer 28 made of several evaporated inorganic thin films having a reflectance of about 0.5% is provided on the surface of the polarizing film 11, whereby the surface reflection by the polarizing film 11 is reduced so that the transmittance is improved, resulting in a brighter display. Moreover, the light reflected by the surface of the polarizing film 11 is reduced, whereby the black level during ON becomes darker, resulting in improved contrast.

However, since an evaporated film is expensive, anti-reflection films of a coating-type composed of one to two layers made by printing an organic material have been developed recently. Although the above anti-reflection films have a reflectance of about 1%, which is a little high, they are low in cost, and thus these anti-reflection films can also be used as the anti-reflection layer 28.

The plane positional relations between components forming the color liquid crystal display device of the second embodiment will be explained hereafter using FIG. 8.

The alignment state of the liquid crystal layer 6 of the STN liquid crystal cell 21 is the same as that of the first embodiment which has been explained with FIG. 3, in which a lower molecular alignment direction 6a is disposed at a +120° angle and an upper molecular alignment direction 6b is disposed at a +60° angle. Consequently, the STN liquid crystal cell having a twist angle Ts of 240° counterclockwise is formed.

A difference Δn in birefringence of the liquid crystal layer 6 is set to 0.15 which is the same as that of the first embodiment, and a cell gap d which is a gap between the first substrate 1 and the second substrate 2 is also set to 5.6 μm. Accordingly, Rs, which is a Δnd value of the STN liquid crystal cell 21, represented by the product of the difference Δn in the birefringence of the liquid crystal layer 6 and the cell gap d, is 0.84 μm.

A transmission axis 14a of the reflection-type polarizing film 14 is directed at a 0° angle with respect to the horizontal axis H—H of a display screen 10.

A polarization axis 11a of the polarizing film 11 is directed at a +135° angle with respect to the horizontal axis H—H as in the first embodiment explained with FIG. 4.

A lower molecular alignment direction 12a and an upper molecular alignment direction 12b of the twisted retardation film 12 are directed at a −35° angle and at a +5° angle respectively, which are the same as those shown in FIG. 4, with respect to the horizontal axis H—H, resulting in the twist angle Tc of 220° clockwise.

Accordingly, the difference ΔT in absolute value of the twist angle between the STN liquid crystal cell 21 and the twist angle Tc results in ΔT=|Ts|−|TC|=20°.

The color liquid crystal display device of the second embodiment structured as above also goes, in the case of reflection display through the use of external light, into a normally white mode displaying white in the OFF state where no voltage is applied, in which light is incident also through between pixels, so that a bright display can be obtained. In the ON state where voltage is applied between first electrodes 3 and second electrodes 4, the molecules of the liquid crystal layer 6 rise, resulting in a black display.

Consequently, the combination of each color of the color filter 17 and ON state and OFF state between the electrodes 3 and 4 enables a full-color display.

When the backlight 27 is turned on in dark circumstances such as at night, light of the backlight 27 passes through the translucent-type light absorbing layer 26, and then linearly polarized light component thereof parallel to the transmission axis of the reflection-type polarizing film 14 passes through the reflection-type polarizing film 14, further through the diffusing layer 13, the STN liquid crystal cell 21 and the twisted retardation film 12, and also through the polarizing film 11, because the linearly polarized component of the light is a linearly polarized light parallel to the polarization axis of the polarizing film 11 during ON state where voltage is applied between the first and second electrodes 3 and 4, to be emitted to the visible side, resulting in a white display.

Meanwhile, since a linearly polarized light component parallel to the reflection axis of the reflection-type polarizing film 14 does not pass through the reflection-type polarizing film 14, there is no linearly polarized light component passing through the polarizing film 11 to be emitted to the visible side during OFF state where no voltage is applied between the first and second electrodes 3 and 4, resulting in a black display.

This results in a reverse display in which white and black during ON state and during OFF state are reversed between the time of reflection illumination by external light and the time of transmission illumination by the backlight 27.

Hence, the positive and negative of a data signal applied to the liquid crystal display device are reversed when the backlight 27 is turned on to thereby resolve the reverse display, obtaining a transmission-type color display of normal colors. Accordingly, a transmission-type liquid crystal device is realized by turning on the backlight 27, enabling recognition of the display even at night.

The higher the transmittance of the translucent-type light absorbing layer 26 is, the brighter the display when the backlight 27 is turned on becomes. However, the contrast of the reflection display by external light lowers when the backlight 27 is turned off.

It is shown that the average transmittance of the translucent-type light absorbing layer 26 is preferably within a range of 20% to 60%, and is more preferably within a range of 30% to 50% by experiment. In the second embodiment of the present invention, through the use of the translucent-type light absorbing layer 26 with an average transmittance of 30% shown by the curved line 37 in FIG. 9, an excellent contrast could be obtained when the liquid crystal display device is used as a reflection-type, and brightness thereof was good when it is used as a transmission-type is also excellent.

The color liquid crystal display device of the second embodiment comprises, as described above, the polarizing film 11, the twisted retardation film 12, the STN liquid crystal cell 21 of which the alignment directions of the middle liquid crystal molecules are parallel to the horizontal axis, the reflection-type polarizing film 14, the translucent-type light absorbing layer 26, and the backlight 27.

This enables a reflection-type color display with high contrast and high chroma through the use of external light in bright circumstances, and a bright transmission-type color display by turning on the backlight 27 in dark circumstances.

Further, spectral characteristics of reflectance in the reflection-type color display are improved to thereby increase the reflectance on the long wavelength side within the visible light region.

This can suppress a coloring phenomenon of the background color and improve the chroma of red, resulting in the reflection-type color display with high contrast and high chroma.

Also in this embodiment, a liquid crystal polymer film of which the twisted state is fixed at room temperature is used as the twisted retardation film 12. However, the use of a temperature-compensation-type twisted retardation film in which part of the liquid crystal molecules are only bound to polymer molecules in a chain state and Rc thereof varies with temperature improves the brightness and contrast at high temperatures, obtaining a better reflection-type color display.

Although a color filter consisting of red filters, green filters and blue filters which are formed into stripes shape is used as the color filter in each of the above-described embodiments, it is also suitable to use a color filter consisting of cyan filters, magenta filters and yellow filters, or to use a color filter consisting of filters of two colors or four or more colors. Each color filter is not limited to a stripe shape, but may be formed in a dot shape of square or circle.

Though the color filter is provided on the inner face of the second substrate 2 which is the visible side of the STN liquid crystal cell, it is also suitable to provide the color filter and the protection film on the inner face of the first substrate 1 which is the opposite side thereto and to provide the first electrodes 3 on the protection film.

As has been described, the color liquid crystal display device according to the present invention comprises the polarizing film 11, the twisted retardation film 12, the color filter 7, the STN liquid crystal cell 20 of which the alignment direction of the middle liquid crystal molecules are parallel to the horizontal axis of the display screen, the reflection-type polarizing film 14, and the light absorbing layer 15.

This can suppress coloring of the background color, especially improving the chroma of red, resulting in the reflection-type color display with good color balance and high chroma.

Further, the translucent-type light absorbing layer 26 is provided in place of the light absorbing layer 15 and the backlight 27 is provided outside the translucent-type light absorbing layer 26, thereby enabling a transmission-type color display.

Consequently, it is possible to recognize a display by backlight illumination in dark places and to perform a display by external light without the backlight illumination in bright places, with the result that a color display with good color balance and high chroma can be obtained in either case.

What is claimed is:

1. A color liquid crystal display device, comprising: an STN liquid crystal cell comprising a first substrate having first electrodes, a second substrate having second electrodes, a color filter provided on any one of said first substrate and second substrate, and a liquid crystal layer composed of a super twisted nematic liquid crystal sealed between said first substrate and second substrate and aligned such that major axes of liquid crystal molecules are twisted at an angle of 180° to 270°;

a polarizing film provided on the outside, which is the visible side of said STN liquid crystal cell, of said second substrate;

a twisted retardation film provided between said polarizing film and said second substrate; and a diffusing layer, a reflection-type polarizing film, and a light absorbing layer provided outside said first substrate in order, wherein said super twisted nematic liquid crystal of said liquid crystal layer is aligned such that major axis directions of liquid crystal molecules located at the middle between said first substrate and second substrate are parallel to a horizontal axis of a display screen, and wherein a difference in absolute value between a twist angle of said liquid crystal layer and a twist angle of said twisted retardation film is 10° to 30°.

2. The color liquid crystal display device according to claim 1, wherein red filters, green filters and blue filters are formed alternately in stripes shape as said color filter.

3. The color liquid crystal display device according to claim 1, wherein said light absorbing layer is a translucent-type light absorbing layer, and a backlight is disposed outside said translucent-type light absorbing layer.

4. The color liquid crystal display device according to claim 3, wherein an average transmittance of said translucent-type light absorbing layer is in a range of 20% to 60%.

5. The color liquid crystal display device according to claim 3, wherein red filters, green filters and blue filters are formed alternately in stripes shape as said color filter.

6. A color liquid crystal display device, comprising:

an STN liquid crystal cell comprising a first substrate having first electrodes, a second substrate having second electrodes, and a liquid crystal layer composed of a super twisted nematic liquid crystal sealed between said first substrate and second substrate and aligned such that major axes of liquid crystal molecules are twisted at an angle of 180° to 270°;

a polarizing film provided on the outside, which is the visible side of said STN liquid crystal cell, of said second substrate; and a twisted retardation film provided between said polarizing film and said second substrate, wherein said super twisted nematic liquid crystal of said liquid crystal layer is aligned such that major axis directions of liquid crystal molecules located at the middle between said first substrate and second substrate are parallel to a horizontal axis of a display screen, and wherein a difference in absolute value between a twist angle of said liquid crystal layer and a twist angle of said twisted retardation film is 10° to 30°.

7. The color liquid crystal display device according to claim 6, wherein a color filter is provided on any one of said first substrate and second substrate, and red filters, green filters and blue filters are formed alternately in stripes shape as said color filter.

* * * * *